Figure 1:
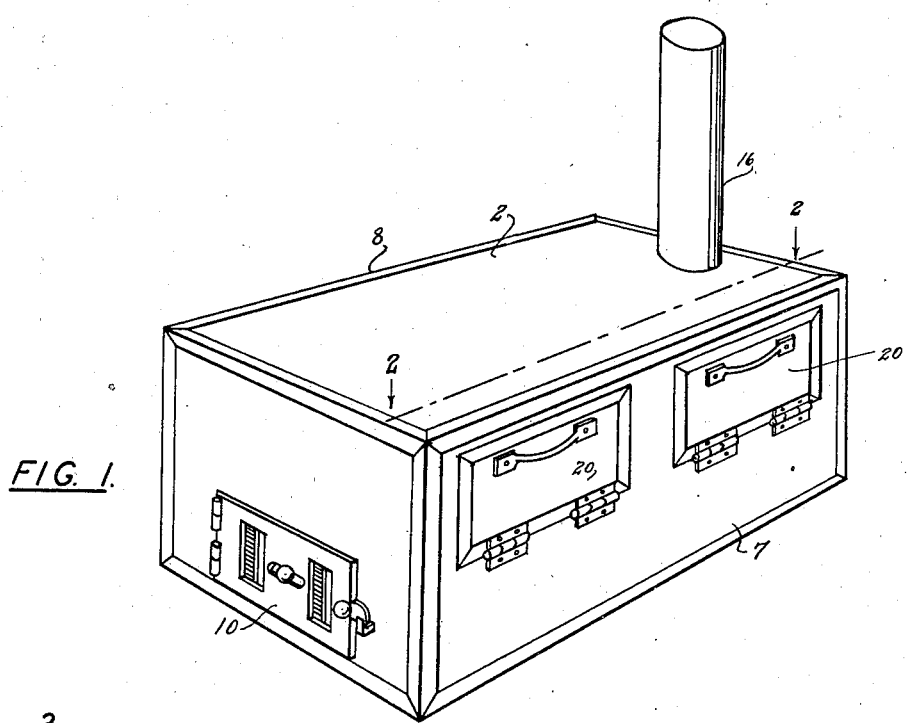

Jan. 17, 1939.  E. ROSSON  2,143,999
PORTABLE BARBECUE PIT
Filed Dec. 7, 1936

INVENTOR.
EARL ROSSON
BY
ATTORNEYS.

Patented Jan. 17, 1939

2,143,999

UNITED STATES PATENT OFFICE 2,143,999

PORTABLE BARBECUE PIT

Earl Rosson, Florence, Ariz.

Application December 7, 1936, Serial No. 114,529

4 Claims. (Cl. 126—29)

My invention relates to barbecue pits wherein meats of various kinds are cooked by exposure to the heat and vapors of burning wood.

Barbecuing may be defined as cooking meats or other foods directly over an open wood fire. In this process it has been found that best results are secured by subjecting the meat to be cooked to the action of glowing coals and the blue smoke ascending therefrom. Meats properly barbecued by this type of heat and smoke are particularly palatable and nutritious, and absorb the flavor of the wood from the smoke. If, on the other hand, any considerable quantity of the white smoke or vapors of the destructive distillation of wood, as it burns, are allowed to come in contact with the food, the latter becomes incrusted with a charred and unpalatable substance composed of soot and condensed wood tars and is not only unpalatable, but apt to cause gastronomic disturbances if eaten in any quantity.

Heretofore, the conditions for ideal barbecuing have been produced only by first building a wood fire in a pit, either dug in the earth or made of brick and open at the top, and letting the burning proceed until all the noxious vapors and white smoke have been released from the wood. When the fire has burned down and only the glowing embers and charcoal remain, emitting heated gases which I call "blue smoke", and then only, is it good practice to place the meats on the grill immediately above the remains of the fire. Even if there is a small portion or stub ends of the wood remaining which give off white smoke, these must be entirely removed from the fire. All this takes time and an excessive amount of wood, as well as the labor involved in first burning the wood down to coals and waiting until conditions are right to place the meat or foods on the grill. Furthermore, in either open pits in the ground or made pits of this nature with lids, it is necessary that the top of the grill be open while the first burning takes place and this necessarily admits a large quantity of ashes and soot to the compartment or place where the cooking is to take place. It has formerly been thought that a certain charred crust and a certain amount of incrusted dirt, ashes and soot was a necessary evil to barbecued meats, which could not be surmounted. However, by my device as herein described, this incrustment and impregnation with noxious fumes is almost wholly, if not entirely, eliminated. Furthermore, the construction of my device, as herein explained, lends itself to a comparatively light construction which is readily portable.

In view of the foregoing, the objects of my invention are, first, to provide a pit, or oven, which may be made of metal or other suitable materials so that it may be easily moved from place to place; second, to provide such a pit, or oven, wherein the undesired smoke and other noxious vapors caused by burning of the wood are diverted and do not come in contact with the foods to be cooked; third, to provide a pit, or oven, wherein access may be had to the foods to be cooked with a minimum loss of heat and without the admission of dirt or dust from the outside; fourth, to provide such a pit, or oven, wherein the foods are exposed to the direct heat of the flame of the burning wood and to such vapors therefrom as are desired to flavor the foods when cooking, together with reflected and radiated heat applied to both the lower and upper side of the foods being cooked; fifth, to provide such a pit, or oven, wherein the fire may be easily controlled and the undesired vapors therefrom controlled and removed directly from the burning space. Other objects will appear hereinafter.

I attain these objects by the manufacture and construction illustrated in the accompanying drawing, in which—

Figure 2:
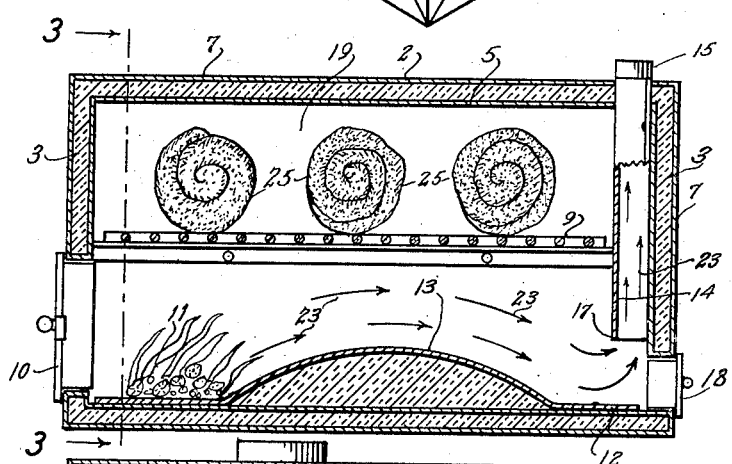
Figure 3:
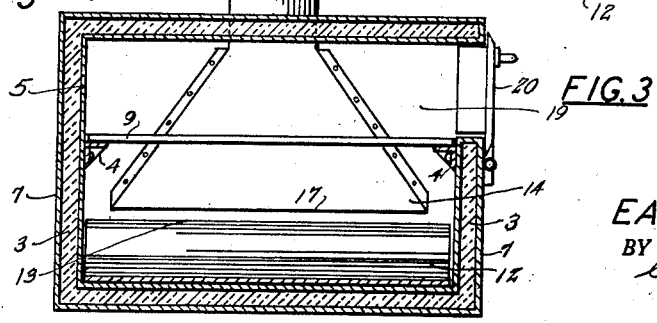

Fig. 1 is a perspective view of my entire pit, or oven; Fig. 2, a vertical section thereof taken substantially on line 2—2, Fig. 1; Fig. 3, a cross-section taken substantially on line 3—3, Fig. 2.

Construction

As shown in Figs. 1 and 2, the general outer appearance of my device is that of a rectangular box, designated by numeral 2. An inner rectangular box of a comparatively heavy sheet metal (about #14 gauge) forms the inner, or main lining of my pit. Numeral 5 designates this inner box or lining. This is surrounded with a light weight fire proof and insulating lagging 3, which may be composed of asbestos sheets, solid asbestos cement, or other suitable equivalent material. Around and on the outside of this lagging is an outer covering 7 composed of comparatively lighter sheet iron (about #22 gauge). This is designed to hold the lagging and insulation in place. The corners may be strengthened by angle iron corner braces 8, extending along all edges. (Shown only in Fig. 1.)

The interior of the pit is divided in a horizontal plane, about mid-way of the height, by a grill 9, which may be composed of parallel iron bars, extending laterally along the interior of the inner box 5. These bars may be fastened together in a frame or set in separately, as desired. As shown in Figs. 2 and 3, they rest on longitudinal supports 4 attached to the sides of box 5. It is the purpose of this grill to support the portions of meat to be cooked and it is necessary that the bars only be heavy enough to support these objects, and the space between them sufficient to allow contact with the heat and desired gases, as hereinafter explained, coming from the fire which is beneath. In the lower portion of the pit and at the front end a door 10 is provided, made of at least two thicknesses of metal and having a draft regulating slide as is in common use in stoves. The fire box 11, of my pit, comprises the space in the lower forward end of the box 5, immediately in front of and at the sides of this door 10.

The bottom of box 5 is provided with a liner 12, to line or form a double inner wall in the fire box portion of box 5. It thence extends a short distance horizontally to form a bottom for said fire box. At a point about one-fourth of the length of the bottom of said box 5, this liner is arched upwardly to form what I term a "separator" 13. This arch continues to a point very near the back end of the bottom of box 5, where it is again made horizontal and rests on said bottom. This liner is made of heavy sheet iron of approximately #10 gauge. The space underneath the separator arch may be filled with insulating material or merely provided with such supports as may be necessary to keep the arch in shape, depending upon the size of the pit desired.

On the inner rear wall of box 5 a smoke hood 14 is attached. This extends across the width of the wall at its mouth, but is angularly narrowed toward the top to form a throat 15, to which a stack 16 is attached. This stack, it is understood, is to be attached to the outside of the pit, and is of a height sufficient to form an adequate draw for the fire, and may optionally be provided with a damper. The lip 17 of the mouth of this smoke vent, it will be noted, is on a horizontal plane with the top of the separator arch.

At the back a door 18 is provided in the back wall of the entire case and is situated so that access may be had to the bottom of the liner immediately below the separator arch. Ashes and soot are apt to accumulate here, and it is necessary to remove them from time to time.

Access is had to the cooking compartment 19 above the grill by doors 20 in the side wall of the case. These doors are preferably made of double walled construction with insulating between the walls and, in the preferred form, swing downwardly thereby forming a shelf when opened. Any suitable latching mechanism and opening and closing handles may be provided for these doors, as with the other doors heretofore described.

Operation

In operating my barbecue pit, or oven, a fire is kindled in the fire box 11 of such suitable and available wood as is desired, considering that, in this process, the flavor from the wood is imparted to the meats to be barbecued. After the fire has sufficiently warmed the interior of the oven, it is only necessary to open the doors 20 and place the meats prepared to be barbecued, 25, on the grill, turning them from time to time as the process continues. It will be noted from the indicating arrows 23, that the course of the smoke and noxious fumes from the burning of the wood, after a suitable draft has been obtained, rise somewhat upwardly over the separator and are then drawn downwardly and out through the mouth of the smoke vent before they have a chance to deflect into the cooking portion 19 of the oven above the grill. It must be understood that, to secure this effect, the distance from the fire box to the mouth of the smoke vent should not be too great, relative to the vertical distance from the top of the separator to the bottom of the grill. In practice, I have found that this longitudinal distance from the fire box to the mouth of the smoke vent should not be greater than three times the vertical distance from the top of the separator arch to the grill. Likewise, the width of the oven should not be out of proportion to this longitudinal distance, and to secure best results the interior width should be approximately half of the length.

When the interior of box 5 is thoroughly heated, the separator arch 13 acts as a convex reflector, throwing heat to all parts of compartment 19, and this is in turn reflected back by the walls and top of inner case 5. This greatly aids in uniform cooking, while the fire directly below the grill adds the flavor necessary to true barbecuing.

The separator arch 13 has two functions. The first is that it forms a channel to direct the white smoke and heavy carbon smoke, products of combustion, first upwardly from the fire box 11 and thence downwardly to enter the hood 14. Thus, it acts as one side of a stream-lined channel for the passage of smoke. In operation, the white smoke and the heavy carbon smoke will follow this channel and, due to their density, will not enter the compartment above the grill to any appreciable extent. The blue smoke, however, being lighter, follows the heat radiating from the burning portions of the wood. This heat, being deflected upwardly, carries with it certain portions of the blue smoke which is not only harmless but desirable in flavoring the foods being cooked.

Having now described my invention and explained its operation, it will be apparent to those familiar with the art, that numerous changes and refinements may be made in its general construction, all of which, however, would retain the general principals and essentials of this invention. Therefore, I make my claims broadly, as follows:

I claim:

1. A portable barbecue oven comprising, in combination, a case body having a substantially rectangular form, a grill within said body supported horizontally about midway of its height to provide a cooking compartment there-above and a combustion compartment there-below, said combustion compartment being provided with a fire box space at the front end thereof and an arched separator deflecting plate rearwardly therefrom and a smoke vent hood on the rear inner wall of said case body, having the lip of the entrance thereto in a horizontal plane with the top of the arch of said deflector plate, an opening provided with a door communicating to the front of said fire box, a stack attached to the upper portion of said smoke vent adapted to produce a draft there-through, and openings to the upper cooking portion of said case, closed by hinged doors, to provide access thereto.

2. A portable barbecue oven comprising, in combination, a rectangular box-like body composed of an inner and an outer metal case having insulating material there-between, the lower portion of the inner case comprising a combustion chamber having a fire box compartment at the front thereof provided with an opening through the front wall of both cases for the admission of fuel closed by a door, an arched separator plate on the floor of said combustion chamber to direct the gasses of combustion first upwardly and thence downwardly toward the rear of said case, and a smoke vent extending across the rear wall of said inner case with the mouth thereof opening near the bottom of said combustion chamber and converging upwardly to form a throat near the top of said inner case and extending outwardly through said inner and outer case to form a throat attachment to receive a stack, a grill horizontally positioned within said inner case above said combustion chamber forming a cooking compartment thereabove and openings provided with swingably mounted doors to provide access to said cooking compartment above said grill.

3. A portable barbecue oven comprising, in combination, a case body composed of an inner rectangular box-like case surrounded by insulating material held in place by an outer sheathing of metal, a grill positioned within said inner case horizontally whereby the portion thereabove constitutes a cooking compartment and the portion of the space there-below a combustion chamber, said case body being provided with openings to said cooking compartment closed with doors hinged to said case and an opening closed by a door communicating to the front end of said combustion chamber, an arched deflector separator plate positioned on the floor of said combustion chamber forming a convex heat deflector and a smoke vent attached to the rear wall of said combustion chamber having its lower lip on a horizontal plane with the top of the arch of said separator plate, means for controlling the draft to said combustion chamber and means for access to the rear portion of said combustion chamber for the removal of ashes therefrom.

4. A portable barbecue oven comprising, in combination, a containing case, a horizontally positioned grill supported therein to provide a cooking compartment thereabove and a burning compartment therebelow, said burning compartment having a fire box at the front end and a smoke vent at the rear end and a longitudinally arched reflector separator on the bottom of said case having the top thereof approximately midway between said burning compartment and said smoke vent; the lip of the mouth of said smoke vent being substantially on a horizontal plane with the top of the arch of said reflector separator.

EARL ROSSON.